US009223129B2

(12) United States Patent
Brown et al.

(10) Patent No.: US 9,223,129 B2
(45) Date of Patent: Dec. 29, 2015

(54) MEMS DEVICE WITH MULTI-SEGMENT FLEXURES

(71) Applicant: Microvision, Inc., Redmond, WA (US)

(72) Inventors: Dean R. Brown, Lynnwood, WA (US); Wyatt O. Davis, Bothell, WA (US); Jason B. Tauscher, Sammamish, WA (US)

(73) Assignee: Microvision, Inc., Redmond, WA (US)

( * ) Notice: Subject to any disclaimer, the term of this patent is extended or adjusted under 35 U.S.C. 154(b) by 420 days.

(21) Appl. No.: 13/866,391

(22) Filed: Apr. 19, 2013

(65) Prior Publication Data

US 2014/0313557 A1  Oct. 23, 2014

(51) Int. Cl.
*G02B 26/08* (2006.01)
*G02B 26/10* (2006.01)

(52) U.S. Cl.
CPC ............ *G02B 26/085* (2013.01); *G02B 26/105* (2013.01)

(58) Field of Classification Search
CPC .... G02B 26/10; G02B 26/101; G02B 26/105; G02B 26/085; G02B 26/0858; G02B 26/0833; G02B 26/0841
USPC ........... 359/198.1, 199.1, 200.7, 199.3, 212.1
See application file for complete search history.

(56) References Cited

U.S. PATENT DOCUMENTS

2005/0253055 A1* 11/2005 Sprague et al. ................ 250/234

* cited by examiner

*Primary Examiner* — Euncha Cherry
(74) *Attorney, Agent, or Firm* — Kevin D. Wills

(57) ABSTRACT

A microelectromechanical systems (MEMS) device includes a scanning platform suspended from a fixed platform by two flexures that form a pivot axis. The two flexures may be symmetric or asymmetric about a centerline of the scanning platform. At least one flexure includes two segments that are not parallel to each other. A second flexure may include two segments with one segment being wider than the other. Flexure design reduces effects of mounting and thermal stresses when the MEMS device is mounted as part of an assembly.

20 Claims, 8 Drawing Sheets

MEMS DEVICE WITH MULTI-SEGMENT FLEXURES

FIELD

The present invention relates generally to microelectromechanical systems (MEMS), and more specifically to the support of scanning platforms within MEMS.

BACKGROUND

Microelectromechanical systems (MEMS) is the technology of very small devices. FIG. 1 shows a prior art MEMS device that includes a scanning platform.

MEMS device 100 includes fixed platform 102, scanning platform 140 and scanning mirror 116. Scanning platform 140 is coupled to fixed platform 102 by flexures 110 and 112, and scanning mirror 116 is coupled to scanning platform 140 by flexures 120 and 122. Scanning platform 140 has a drive coil connected to drive lines 150.

In operation, current introduced into the drive coil causes the scanning platform to move relative to the fixed platform when in the presence of a magnetic field. Control systems are typically employed to control the movement of the scanning platform relative to the fixed platform.

MEMS device 100 is typically mounted to an assembly. If the MEMS device and the assembly to which the MEMS device is mounted do not exhibit identical thermal expansion behavior, or if they are not exactly co-planar, stress forces may be transmitted to the MEMS device due to expansion, contraction, die warpage, or the like. These stresses can be transmitted to the flexures supporting the scanning platform and/or the scanning mirror, thereby changing their stiffness characteristics. For example, compressive stresses due to material shrinkage at different rates may reduce the bending stiffness of flexures 110 and 112, thereby changing their resonant behavior. Control system design may become more complicated as a result.

DESCRIPTION OF EMBODIMENTS

Figure 1:
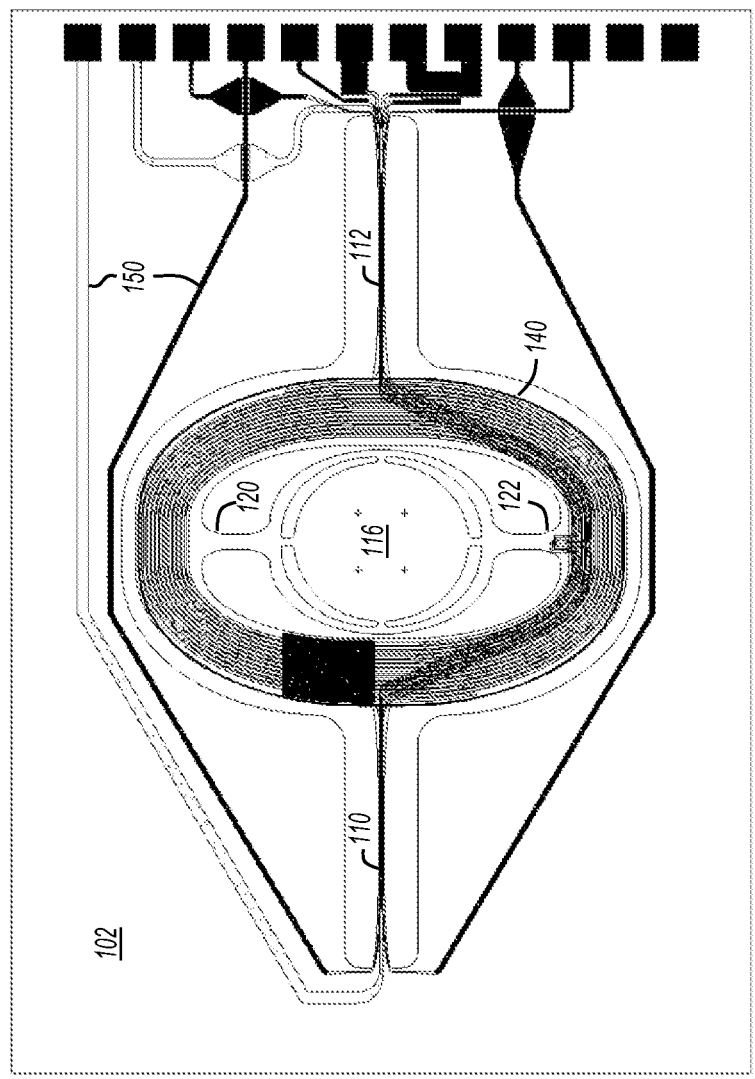
FIG. 1 shows a prior art microelectromechanical system (MEMS) device.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 2:
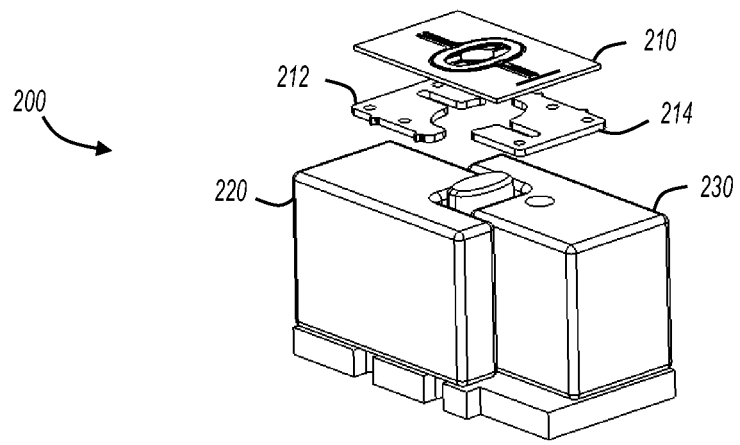
FIG. 2 shows an exploded perspective view of an assembly with a MEMS device in accordance with various embodiments of the present invention.

FIG. 2 shows an exploded perspective view of an assembly with a MEMS device in accordance with various embodiments of the present invention. MEMS assembly 200 includes MEMS device 210, spacers 212 and 214, and fixed magnets 220 and 230. In some embodiments, spacers 212 and 214 are metal, and in other embodiments, spacers 212 and 214 are plastic. For example, in some embodiments, spacers 212 and 214 are metal devices that function as magnetic field focusing plates. Also for example, in some embodiments, spacers 212 and 214 are plastic devices that provide space for the scanning platform to move relative to the fixed platform without being obstructed by other components within assembly 200.

MEMS device 210 includes at least one flexure with multiple segments. In some embodiments, MEMS device 210 includes two flexures with multiple segments. In some embodiments, the flexures are symmetric about a centerline of the scanning platform, and in other embodiments, the flexures are asymmetric about a centerline of the scanning platform. Examples of MEMS devices in accordance with these and other embodiments are further described below with reference to later figures.

In some embodiments, MEMS device 210 is mounted to spacers 212 and 214, and in other embodiments, MEMS device 210 is mounted to fixed magnets 220 and 230. Further, in some embodiments, MEMS device 210 is manufactured on a silicon substrate. Accordingly, MEMS device 210 and one or more components to which the MEMS device is attached or bonded may be of dissimilar materials, and may not be perfectly co-planar. As further described below, various embodiments of the present invention include flexure designs that potentially reduce adverse effects that can arise in various assemblies.

Figure 3:
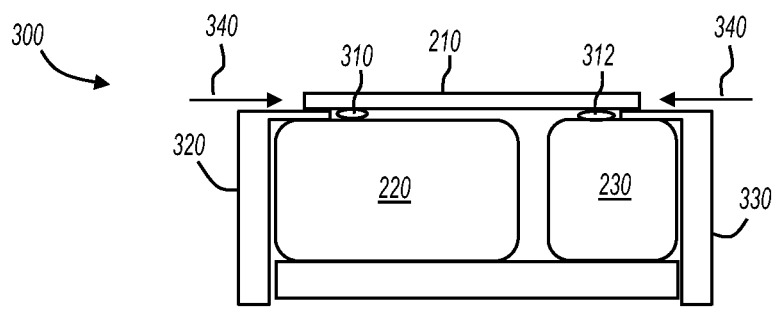
FIG. 3 shows a cross section of an assembly with a MEMS device in accordance with various embodiments of the present invention.

FIG. 3 shows a cross section of an assembly with a MEMS device in accordance with various embodiments of the present invention. Assembly 300 is similar, but not identical, to assembly 200 (FIG. 2). Assembly 300 includes MEMS device 210 and magnets 220 and 230, which are also shown in FIG. 2. Assembly 300 also includes spacers 320 and 330, and adhesive 310 and 312.

Magnets 220 and 230, and spacers 320 and 330 are components within assembly 300 that may be made of dissimilar materials. For example, spacers 320 and 330 may be made of plastic and magnets 220 and 230 may be made of metal. Further, MEMS device 210 may be made from a silicon substrate. Spacers 320 and 330 may perform any function, including providing space for the scanning platform to move, as well aiding in subcomponent alignment during the assembly process.

In some embodiments as represented by the example assembly of FIG. 2, MEMS device 210 is bonded with adhesive to metal pieces, with a gap controlled by a plastic spacer. The dissimilar materials in the assembly expand and contract at different rates over ambient temperature fluctuations, resulting in variable stresses imparted to the MEMS device. In addition, the MEMS device and the surfaces to which the MEMS device attach may not be exactly co-planar, resulting in warping stresses. If these stresses are transmitted to the flexures supporting the scanning platform and/or mirror structure, the stiffness characteristics of the flexures may change. For example, compressive stresses (shown by arrows 340) due to material shrinkage at different rates may reduce the bending stiffness of the flexures and even lead to buckling. Various embodiments of the present invention provide MEMS devices with flexures that reduce adverse effects of these stresses. For example, in some embodiments, flexures with multiple nonparallel segments serve to mechanically isolate the main body of the flexure from these stresses.

Figure 4:
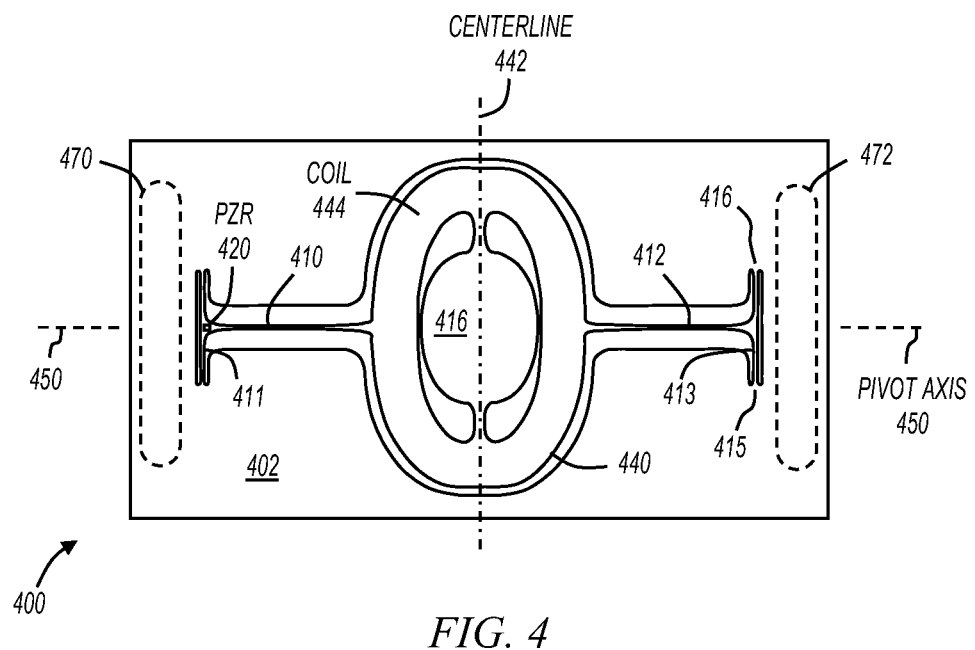
FIG. 4 shows a top view of a MEMS device with multi-segment flexures in accordance with various embodiments of the present invention.

FIG. 4 shows a top view of a MEMS device with multi-segment flexures in accordance with various embodiments of the present invention. MEMS device 400 is an example of a MEMS device suitable for use in an assembly such as assembly 200 (FIG. 2) or assembly 300 (FIG. 3). MEMS device 400 includes fixed platform 402, scanning platform 440, and scanning mirror 416. Scanning platform 440 is suspended from fixed platform 402 by two flexures that form pivot axis 450. A first flexure includes segments 412 and 413, and a second flexure includes segments 410 and 411.

Scanning platform 440 includes a conductive coil around scanning mirror 416 at 444 (not shown in detail). See FIG. 1 for an example of a conductive coil on a scanning platform. Current may be driven into the conductive coil using conductive pads (not shown) on fixed platform 402. In operation, an external magnetic field source (not shown) imposes a magnetic field on the conductive coil. The magnetic field imposed on the conductive coil by the external magnetic field source has a component in the plane of the coil, and is oriented non-orthogonally with respect to the two scan axes (pivot axis 450 and centerline 442). The in-plane current in the coil windings interacts with the in-plane magnetic field to produce out-of-plane Lorentz forces on the conductors. Since the drive current forms a loop on scanning platform 440, the current reverses sign across the scan axes. This means the Lorentz forces also reverse sign across the scan axes, resulting in a torque in the plane of, and normal to, the magnetic field. This combined torque produces responses in the two scan directions depending on the frequency content of the torque.

Scanning platform 440 moves relative to fixed platform 402 in response to the torque. Flexure segments 410 and 412 are torsional members that twist as scanning platform 440 undergoes an angular displacement with respect to fixed platform 402. In some embodiments, scanning mirror 416 moves relative to scanning platform 440 at a resonant frequency, although this is not a limitation of the present invention.

The long axis of flexure segments 410 and 412 form a pivot axis. Flexure segments 410 and 412 are flexible members that undergo a torsional flexure, thereby allowing scanning platform 440 to rotate on the pivot axis and have an angular displacement relative to fixed platform 402. The term "flexure" as used herein refers to any flexible member coupling a scanning platform to another platform (scanning or fixed), and capable of movement that allows the scanning platform to have an angular displacement with respect to the other platform. The term "flexure segment" as used herein refers to any portion of a flexure. Various flexure embodiments and flexure segment embodiments are further described below.

MEMS device 400 is referred to as a "moving-coil device" in part because conductive coil 444 (and scanning platform 440) moves in the presence of a magnetic field. In other embodiments, the scanning platform has one or more fixed magnets attached thereto, and the coil is stationary. In still further embodiments, other types of drive mechanisms are utilized (e.g., capacitively driven MEMS mirrors). The type of drive mechanism used to cause mirror motion is not a limitation of the present invention.

Flexure segments 412 and 413 are nonparallel flexure segments that together form a single flexure. Segment 412 is oriented longitudinally along pivot axis 450. One end of segment 412 is coupled to scanning platform 440, and the opposing end of segment 412 is coupled to segment 413. Segment 413 is coupled to fixed platform 402 at two ends. For example, ends 415 and 416 of segment 413 are coupled to fixed platform 402.

In some embodiments, flexure segments 412 and 413 are at right angles to each other, but this is not a limitation of the present invention. For example, in some embodiments, segments 412 and 413 are nonparallel, but are not at 90 degrees relative to each other. Further, in some embodiments, segment 412 bisects segment 413, but this is not a limitation of the present invention. For example, in some embodiments, segment 412 is coupled to a point on segment 413 that is not a mid-point. In still further embodiments, segment 413 is perpendicularly bisected by segment 412. In these embodiments, segments 412 and 413 are at right angles, and segment 412 is coupled to a mid-point on segment 413.

Scanning platform 440 is also supported by a second flexure that includes segments 410 and 411. Segment 410 is oriented longitudinally along pivot axis 450, and is coupled to scanning platform 440 and segment 411. Segment 411 is oriented nonparallel to segment 410, is coupled to fixed platform 402 at two endpoints, and is coupled to segment 410 at a mid-point. As shown in FIG. 4, the two flexures are symmetric about centerline 442, which is orthogonal to the pivot axis 450, although this is not a limitation of the present invention.

MEMS device 400 also includes piezoresistive (PZR) sensor 420 located near the junction of flexure segments 410 and 411. PZR sensor 420 is an example of a position sensor that provides a voltage related to mechanical stress. When the mechanical stress is caused by torsional deformation of flexure segment 410, the voltage provided by PZR sensor 420 reflects an angular displacement of scanning platform 440, which is a desired mode of operation. PZR sensor 420 will also sense stresses related to undesired modes of vibration. For example, an undesirable mode may correspond to scanning platform 440 rotating at least partially on an axis other than pivot axis 450, resulting in portions of flexure segments 410 and 412 bending out of the plane of MEMS device 400.

Undesirable modes of vibration are further discussed below with reference to later figures.

Also shown in FIG. 4 are bonding sites 470 and 472 which are located beyond the first and second flexures along the pivot axis. In some embodiments, fixed platform 402 is bonded to other components in an assembly at bonding sites 470 and 472. For example, adhesive may be applied on the underside of fixed platform 402 at bonding sites 470 and 472, and then fixed platform 402 may be affixed to one or more components within an assembly. In some embodiments, fixed platform 402 may be affixed to a component made of a dissimilar material that has different thermal expansion behavior or that is not co-planar with MEMS device 400. In these embodiments, stresses resulting from bonding or temperature changes may be transmitted to fixed platform 402.

The flexure design shown in FIG. 4 provides a degree of mechanical isolation between the longitudinal flexure segments 410, 412 and fixed platform 402. For example, if fixed platform 402 experiences stresses due to expansion, contraction, warpage, or the like, the nonparallel flexure segments provide a degree of mechanical isolation such that the bending stiffness of longitudinal flexure segments 410, 412 and the resonant behavior of the entire MEMS device are less affected by the stresses experienced by fixed platform 402.

Figure 5:
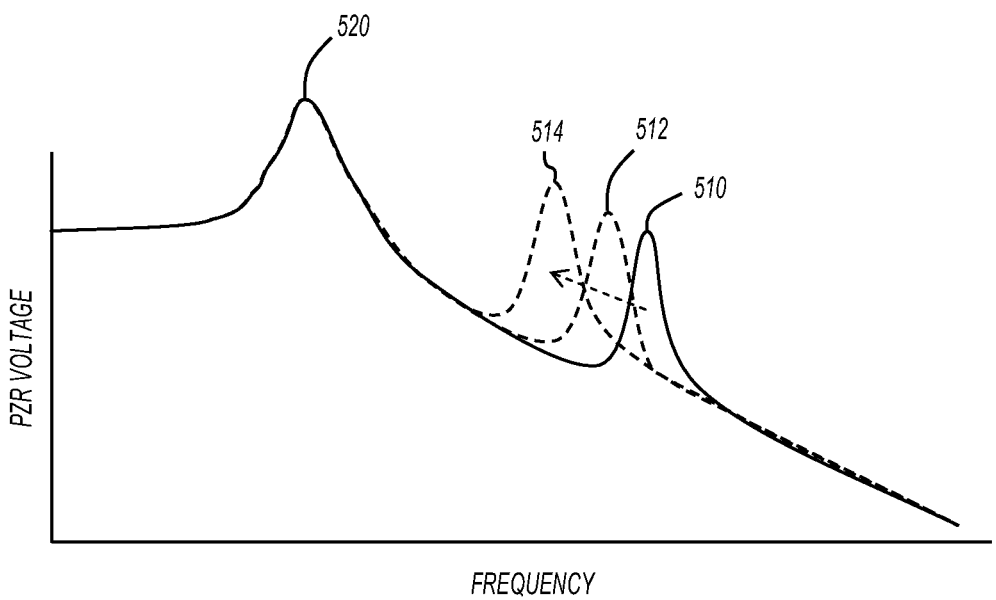
FIG. 5 shows a plot of PZR sensor voltage versus frequency in accordance with various embodiments of the present invention.

FIG. 5 shows a plot of PZR sensor voltage versus frequency in accordance with various embodiments of the present invention. The plot shown in FIG. 5 represents PZR sensor voltage provided by PZR sensor 420 in MEMS device 400 as a function of actuation frequency. The large amplitude at 520 represents the dominant resonant mode of MEMS device 400 in which scanning platform 440 angularly oscillates back and forth on pivot axis 450. The large amplitude at 510 represents an undesirable mode of vibration involving bending deformation of the flexures.

The frequency and amplitude of undesired modes of vibration (resonant behavior), such as out-of-plane translation of scanning platform 440, are related to the bending stiffness of the flexures. These vibration modes induce stresses that are sensed by the PZR sensor, contributing to PZR sensor voltage at 510. A compressive force along the pivot axis 450 that reduces the bending stiffness of the flexures will in turn reduce the frequency of the undesirable vibration mode at 510, potentially placing that frequency near enough to the frequency of the desired rotational mode of vibration 520 to interfere with control of the rotational motion using the PZR sensor voltage as a feedback signal.

As shown in FIG. 5, the frequency of the undesirable mode of vibration at 510 decreases as the bending stiffness of the flexures is reduced. A large reduction in bending stiffness results in a large reduction in frequency as shown at 514, and a lesser reduction in bending stiffness results in a smaller change in frequency as shown at 512.

MEMS devices, assemblies, and flexures in accordance with various embodiments of the present invention provide mechanical isolation between the flexures and the fixed platform. As a result, stresses placed on the fixed platform have a reduced effect on the bending stiffness of the flexures, and also have a reduced effect on the frequency behavior of undesired modes of vibration. For example, in some embodiments of the present invention, the frequency change may be as shown at 512, whereas prior art devices may exhibit a frequency change as shown at 514.

Figure 6:
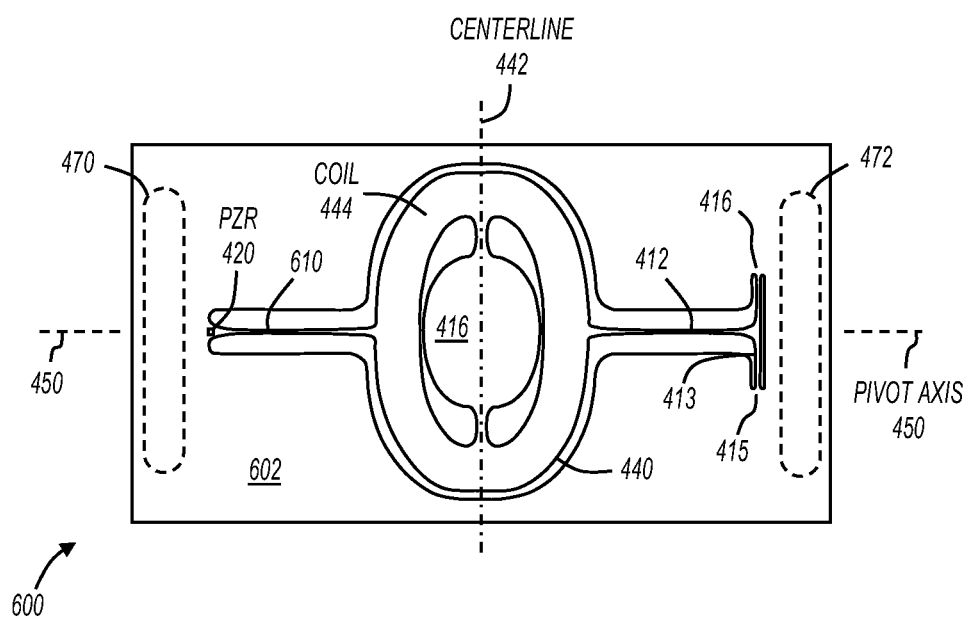
FIGS. 6 and 7 show top views of MEMS devices with asymmetric flexures in accordance with various embodiments of the present invention.

FIG. 6 shows a top view of a MEMS device with asymmetric flexures in accordance with various embodiments of the present invention. MEMS device 600 is an example of a MEMS device suitable for use in an assembly such as assembly 200 (FIG. 2) or assembly 300 (FIG. 3). MEMS device 600 includes fixed platform 602, scanning platform 440, and scanning mirror 416. Scanning platform 440 is suspended from fixed platform 602 by two flexures that form pivot axis 450. A first flexure includes segments 412 and 413, and a second flexure includes segment 610.

MEMS device 600 is similar to MEMS device 400 (FIG. 4) with the exception of the flexures. A first flexure includes segments 412 and 413, and is identical to the first flexure of MEMS device 400. The second flexure 610 is, however, different. Second flexure 610 includes a single segment that is oriented longitudinally along the pivot axis, coupled to scanning platform 440 and fixed platform 602. Accordingly, the two flexures shown in FIG. 6 are asymmetric with respect to the centerline 442 of scanning platform 440, where the centerline is orthogonal to the pivot axis 450.

MEMS device 600 exhibits resonant behavior similar to that of MEMS device 400 (FIG. 4). A single flexure with nonparallel segments 412, 413 provides sufficient mechanical isolation to reduce the change in resonant behavior when under stress as shown in FIG. 5. The simpler flexure structure shown at 610 provides a more stable platform to mount PZR 420.

Figure 7:
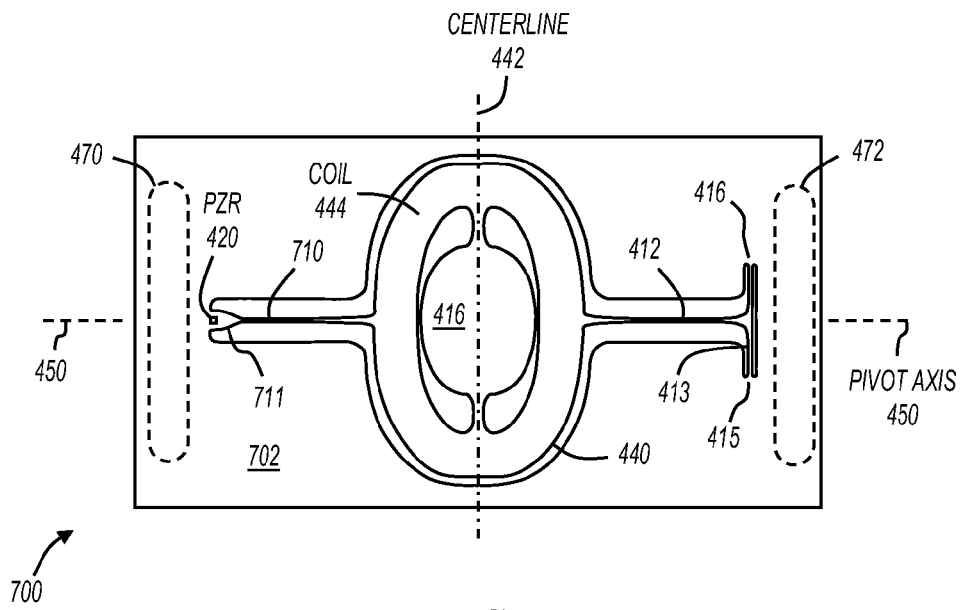

FIG. 7 shows a top view of a MEMS device with asymmetric flexures in accordance with various embodiments of the present invention. MEMS device 700 is an example of a MEMS device suitable for use in an assembly such as assembly 200 (FIG. 2) or assembly 300 (FIG. 3). MEMS device 700 includes fixed platform 702, scanning platform 440, and scanning mirror 416. Scanning platform 440 is suspended from fixed platform 702 by two flexures that form pivot axis 450. A first flexure includes segments 412 and 413, and a second flexure includes segments 710 and 711.

MEMS device 700 is similar to MEMS device 400 (FIG. 4) with the exception of the flexures. A first flexure includes segments 412 and 413, and is identical to the first flexure of MEMS device 400. The second flexure shown in FIG. 7 includes segments 710 and 711. Segment 710 is coupled to scanning platform 440 and is oriented longitudinally along the pivot axis. Segment 711 is coupled to both segment 710 and fixed platform 702, and is also oriented longitudinally along the pivot axis. Segment 710 has a first width, and segment 711 has a second width greater than the first width. PZR sensor 420 is located on the second segment 711. Accordingly, the two flexures shown in FIG. 7 are asymmetric with respect to the centerline 442 of scanning platform 440, where the centerline is orthogonal to the pivot axis 450.

MEMS device 700 exhibits resonant behavior similar to that of MEMS device 400 (FIG. 4); however, the amplitude of the PZR sensor voltage is somewhat reduced because the PZR sensor is located on a wider flexure segment that is subject to less mechanical stress as scanning platform 440 moves. A single flexure with nonparallel segments 412, 413 provides sufficient mechanical isolation to reduce the change in resonant behavior when under stress as shown in FIG. 5. The flexure structure including segments 710, 711 provides a wider and more stable platform to mount PZR sensor 420.

Figure 8:
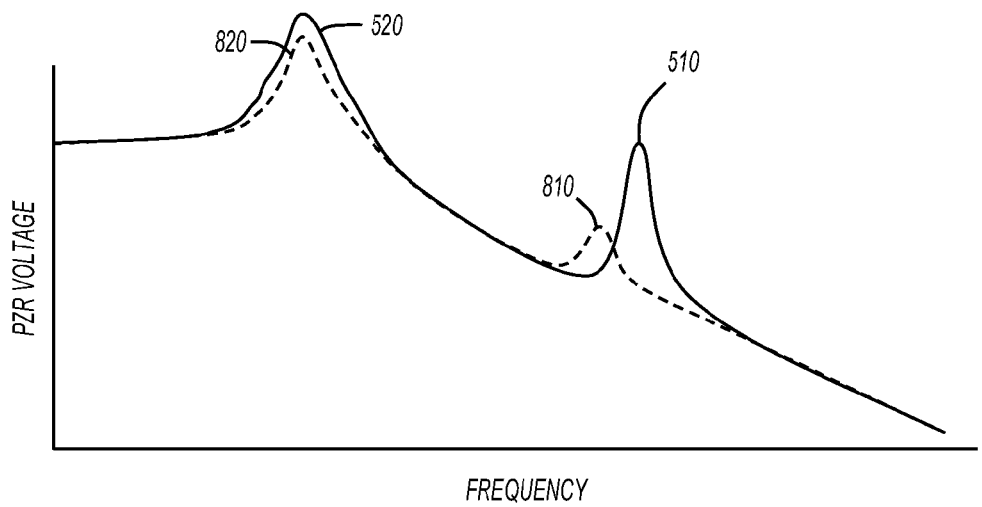
FIG. 8 shows a plot of PZR sensor voltage versus frequency in accordance with various embodiments of the present invention.

FIG. 8 shows a plot of PZR sensor voltage versus frequency in accordance with various embodiments of the present invention. The plot shown in FIG. 8 represents PZR sensor voltage provided by PZR sensor 420 in MEMS device 700 as a function of actuation frequency. The large amplitude at 820 represents the dominant resonant mode of MEMS device 700 in which scanning platform 440 angularly oscillates back and forth on pivot axis 450. The large amplitude at 810 represents an undesirable mode of vibration involving bending deformation of the flexures.

The PZR sensor voltage at 810 and 820 is superimposed on the PZR sensor voltage at 510 and 520 to show how the asymmetric flexure design of MEMS device 700 (FIG. 7) suppresses PZR pickup of the undesirable mode of vibration as well as control the change in resonant behavior due to mechanical stresses.

Various embodiments of the present invention utilize asymmetric flexures to greatly reduce sensitivity to motions of undesirable vibration modes, and to provide much greater stability in the frequencies of the undesirable vibration modes when subjected to varying environmental and die mounting conditions.

These flexure designs improve the MEMS behavior, easing the design constraints on the control system which provides the signals required for the precise movement of the scanning mirror, needed in order to produce a high-quality scanned image.

By utilizing flexure segment 711 (FIG. 7) having a cross section that widens at the location of the PZR sensor, the sensitivity to the unwanted motion is greatly reduced, as shown by the reduced amplitude at 810. By utilizing a multi-segment flexure with nonparallel segments (412, 413, FIG. 7), the sensitivity of the frequencies of the unwanted modes to environmental factors is greatly reduced as described above with reference to FIG. 5. In combination, as an asymmetric pair, this opens the possibility of using no filtering of the PZR output signal, allowing a simpler and more stable control algorithm. As shown at 820, the PZR sensor experiences a reduction in the output of the desired signal 820 due to torsional motion, but reduces the unwanted signals 810 by even more, providing greater than 20 dB additional headroom.

Figure 9:
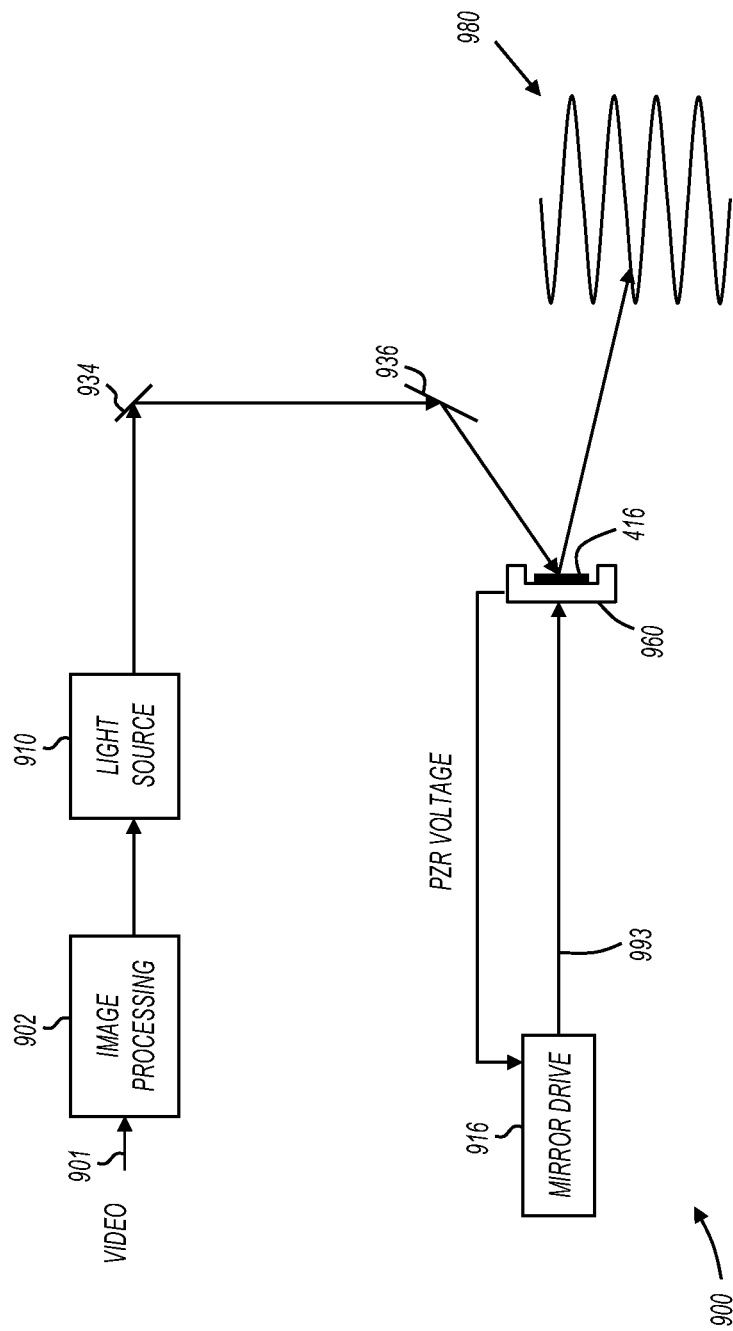
FIG. 9 shows a projection device in accordance with various embodiments of the present invention.

FIG. 9 shows a projection device in accordance with various embodiments of the present invention. Scanning laser projector 900 includes image processing component 902, light source 910, MEMS assembly 960 having scanning mirror 416, and mirror drive circuit 916.

In operation, image processing component 902 receives video data on node 901 and produces display pixel data to drive light source 910 when pixels are to be displayed. The video data on node 901 represents image source data that is typically received with pixel data on a rectilinear grid, but this is not essential. For example, video data on node 901 may represent a grid of pixels at any resolution (e.g., 640×480, 848×480, 1920×1080). Scanning laser projector 900 is a scanning projector that scans a raster pattern shown at 980. The raster pattern does not necessarily align with the rectilinear grid in the image source data, and image processing component 902 operates to produce display pixel data that will be displayed at appropriate points on the raster pattern. For example, in some embodiments, image processing component 902 interpolates vertically and/or horizontally between pixels in the source image data to determine display pixel values along the scan trajectory of the raster pattern.

Video processing component 102 may include any circuitry capable of performing the functions described. For example, in some embodiments, image processing component 902 includes digital circuits capable of performing interpolation such as multipliers, shifters, and adders. Also for example, in some embodiments, image processing component 902 may include hardware circuits and may also include a processor that executes instructions.

Light source 910 receives display pixel data and produces light having grayscale values in response thereto. Light source 910 may be monochrome or may include multiple different color light sources. For example, in some embodiments, light source 910 includes red, green, and blue light sources. In these embodiments, image processing component 902 outputs display pixel data corresponding to each of the red, green, and blue light sources. Also for example, light produced by light source 910 may be visible or nonvisible. For example, in some embodiments, one or more sources of light within light source 910 may produce infrared (IR) light. In some embodiments, light source 910 may include one or more laser light producing devices. For example, in some embodiments, the light source 910 may include laser diodes.

The light from light source 910 is directed to mirror 416 via guiding optics 934, 936. Any type of optical element may be included in the light path between light source 910 and mirror 416. For example, scanning laser projector 900 may include collimating lenses, dichroic mirrors, or any other suitable optical elements.

MEMS assembly 960 may be any of the assemblies with any of the MEMS devices described herein. For example, MEMS assembly 960 may include any of MEMS devices 400 (FIG. 4), 600 (FIG. 6), or 700 (FIG. 7).

Scanning mirror 415 deflects on two axes in response to electrical stimuli received on node 993 from mirror drive circuits 916. While moving on the two axes, scanning mirror 416 reflects modulated light provided by light source 910. The reflected light sweeps a raster pattern and creates a resultant display in an image plane at 980. The shape of the raster pattern swept by scanning mirror 416 is a function of the mirror movement on its two axes. For example, in some embodiments, scanning mirror 416 sweeps on a first axis (e.g., pivot axis 450 in the vertical dimension) in response to sawtooth wave stimulus, resulting in a substantially linear and unidirectional vertical sweep. Also for example, in some embodiments, scanning mirror 416 sweeps on a second axis (e.g., centerline 442 in the horizontal dimension) according to a sinusoidal stimulus, resulting in a substantially sinusoidal horizontal sweep.

MEMS device 960 is an example of a scanning mirror assembly that scans light in two dimensions. In some embodiments the scanning mirror assembly includes a single mirror that scans in two dimensions (e.g., on two axes). Alternatively, in some embodiments, MEMS device 960 may be an assembly that includes two scan mirrors, one which deflects the beam along one axis, and another which deflects the beam along a second axis largely perpendicular to the first axis.

MEMS assembly 960 provides the PZR voltage to mirror drive circuits 916 as a feedback signal. The PZR voltage is in accordance with the plots shown in FIGS. 5 and 8 for the various disclosed MEMS embodiments. With the reduced sensitivity to undesirable vibration modes provided by the various embodiments of the present invention, the design of mirror drive circuit 916 may be greatly simplified. For example, reduced electrical filtering of the PZR sensor may be employed, thereby reducing loop instability issues caused by reduced phase and/or gain margins.

Figure 10:
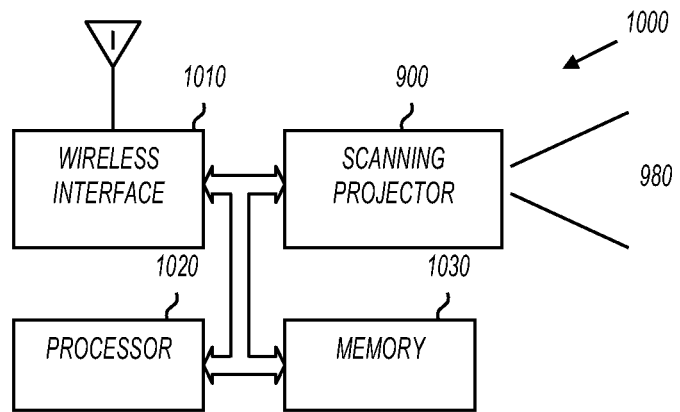
FIG. 10 shows a block diagram of a mobile device in accordance with various embodiments of the present invention.

FIG. 10 shows a block diagram of a mobile device in accordance with various embodiments of the present invention. As shown in FIG. 10, mobile device 1000 includes wireless interface 1010, processor 1020, memory 1030, and scanning projector 900. Scanning projector 900 paints a raster image at image plane 980 as described above with reference to FIG. 9. Scanning projector 900 includes a MEMS device with symmetric or asymmetric flexures as described above with reference to previous figures.

Scanning projector 900 may receive image data from any image source. For example, in some embodiments, scanning projector 900 includes memory that holds still images. In other embodiments, scanning projector 900 includes memory that includes video images. In still further embodiments, scanning projector 900 displays imagery received from external sources such as connectors, wireless interface 1010, a wired interface, or the like.

Wireless interface 1010 may include any wireless transmission and/or reception capabilities. For example, in some embodiments, wireless interface 1010 includes a network interface card (NIC) capable of communicating over a wireless network. Also for example, in some embodiments, wireless interface 1010 may include cellular telephone capabilities. In still further embodiments, wireless interface 1010 may include a global positioning system (GPS) receiver. One skilled in the art will understand that wireless interface 1010 may include any type of wireless communications capability without departing from the scope of the present invention.

Processor 1020 may be any type of processor capable of communicating with the various components in mobile device 1000. For example, processor 1020 may be an embedded processor available from application specific integrated circuit (ASIC) vendors, or may be a commercially available microprocessor. In some embodiments, processor 1020 provides image or video data to scanning projector 900. The image or video data may be retrieved from wireless interface 1010 or may be derived from data retrieved from wireless interface 1010. For example, through processor 1020, scanning projector 900 may display images or video received directly from wireless interface 1010. Also for example, processor 1020 may provide overlays to add to images and/or video received from wireless interface 1010, or may alter stored imagery based on data received from wireless interface 1010 (e.g., modifying a map display in GPS embodiments in which wireless interface 1010 provides location coordinates).

Figure 11:
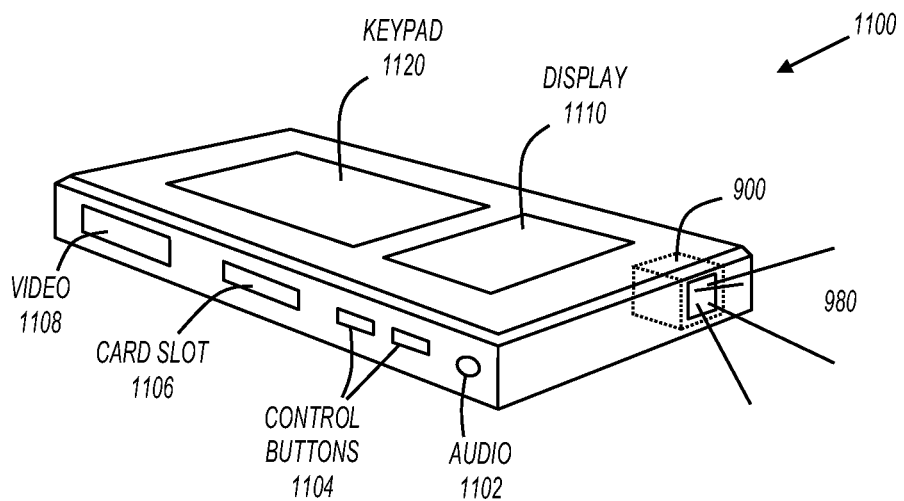
FIG. 11 shows a mobile device in accordance with various embodiments of the present invention.

FIG. 11 shows a mobile device in accordance with various embodiments of the present invention. Mobile device 1100 may be a hand held projection device with or without communications ability. For example, in some embodiments, mobile device 1100 may be a handheld projector with little or no other capabilities. Also for example, in some embodiments, mobile device 1100 may be a device usable for communications, including for example, a cellular phone, a smart phone, a personal digital assistant (PDA), a global positioning system (GPS) receiver, or the like. Further, mobile device 1100 may be connected to a larger network via a wireless (e.g., WiMax) or cellular connection, or this device can accept data messages or video content via an unregulated spectrum (e.g., WiFi) connection.

Mobile device 1100 includes scanning projector 900 to create an image with light at image plane 980. Mobile device 1100 also includes many other types of circuitry; however, they are intentionally omitted from FIG. 11 for clarity.

Mobile device 1100 includes display 1110, keypad 1120, audio port 1102, control buttons 1104, card slot 1106, and audio/video (A/V) port 1108. None of these elements are essential. For example, mobile device 1100 may only include scanning projector 900 without any of display 1110, keypad 1120, audio port 1102, control buttons 1104, card slot 1106, or A/V port 1108. Some embodiments include a subset of these elements. For example, an accessory projector product may include scanning projector 900, control buttons 1104 and A/V port 1108.

Display 1110 may be any type of display. For example, in some embodiments, display 1110 includes a liquid crystal display (LCD) screen. Display 1110 may always display the same content projected at image plane 980 or different content. For example, an accessory projector product may always display the same content, whereas a mobile phone embodiment may project one type of content at image plane 980 while displaying different content on display 1110. Keypad 1120 may be a phone keypad or any other type of keypad.

A/V port 1108 accepts and/or transmits video and/or audio signals. For example, A/V port 1108 may be a digital port that accepts a cable suitable to carry digital audio and video data such as a high definition multimedia interface (HDMI) port. Further, A/V port 1108 may include RCA jacks to accept composite inputs. Still further, A/V port 1108 may include a VGA connector to accept analog video signals. In some embodiments, mobile device 1100 may be tethered to an external signal source through A/V port 1108, and mobile device 1100 may project content accepted through A/V port 1108. In other embodiments, mobile device 1100 may be an originator of content, and A/V port 1108 is used to transmit content to a different device.

Audio port 1102 provides audio signals. For example, in some embodiments, mobile device 1100 is a media player that can store and play audio and video. In these embodiments, the video may be projected at image plane 980 and the audio may be output at audio port 1102. In other embodiments, mobile device 1100 may be an accessory projector that receives audio and video at A/V port 1108. In these embodiments, mobile device 1100 may project the video content at image plane 980, and output the audio content at audio port 1102.

Mobile device 1100 also includes card slot 1106. In some embodiments, a memory card inserted in card slot 1106 may provide a source for audio to be output at audio port 1102 and/or video data to be projected at image plane 980. Card slot 1106 may receive any type of solid state memory device, including for example, Multimedia Memory Cards (MMCs), secure digital (SD) memory cards, and microSD cards. The foregoing list is meant to be exemplary, and not exhaustive.

Figure 12:
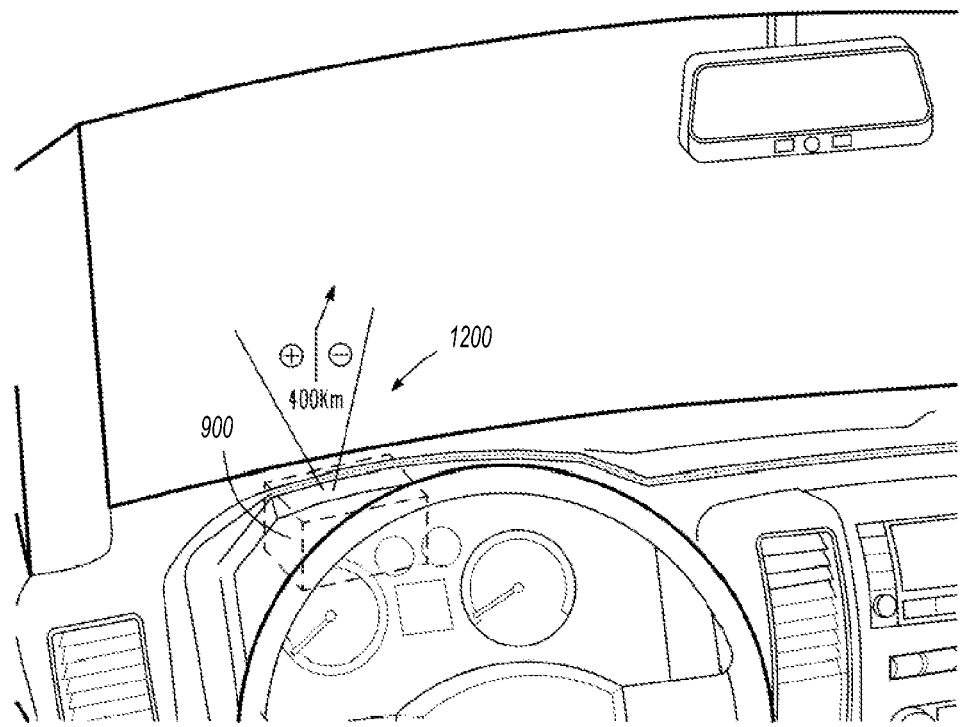
FIG. 12 shows a head-up display system in accordance with various embodiments of the invention.

FIG. 12 shows a head-up display system in accordance with various embodiments of the invention. Projector 900 is shown mounted in a vehicle dash to project the head-up display at 1200. Although an automotive head-up display is shown in FIG. 12, this is not a limitation of the present invention. For example, various embodiments of the invention include head-up displays in avionics application, air traffic control applications, and other applications.

Figure 13:
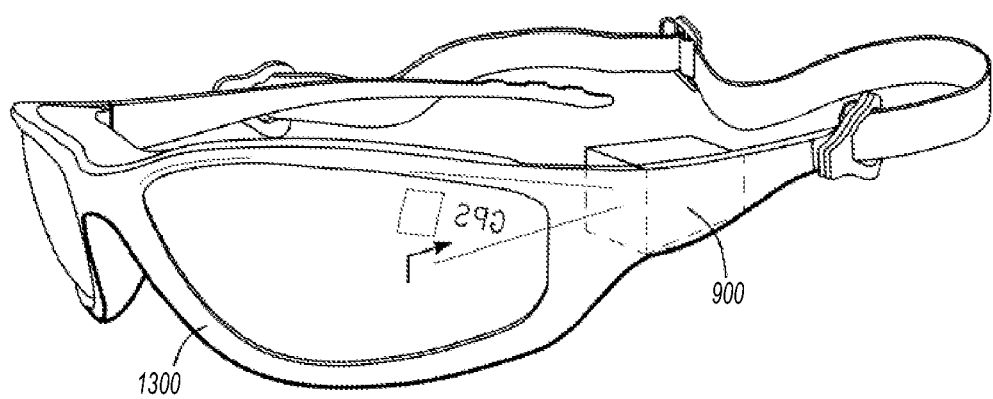
FIG. 13 shows eyewear in accordance with various embodiments of the invention.

FIG. 13 shows eyewear in accordance with various embodiments of the invention. Eyewear 1300 includes projector 900 to project a display in the eyewear's field of view. In some embodiments, eyewear 1300 is see-through and in other embodiments, eyewear 1300 is opaque. For example, eyewear may be used in an augmented reality application in which a wearer can see the display from projector 900 overlaid on the physical world. Also for example, eyewear may be used in a virtual reality application, in which a wearer's entire view is generated by projector 900. Although only one projector 900 is shown in FIG. 13, this is not a limitation of the present invention. For example, in some embodiments, eyewear 1300 includes two projectors; one for each eye.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:
1. A scanning mirror assembly comprising:
   a microelectromechanical system (MEMS) device that includes a fixed platform and a scanning platform suspended from the fixed platform by first and second flexures, wherein the first flexure is coupled with the fixed platform via a first flexure segment, and the second flexure is coupled with the fixed platform via a second flexure segment, the first flexure segment being wider than the second flexure segment; and a sensor disposed on the first flexure segment to produce an output in response to rotation of the scanning platform about a pivot axis;

wherein the output of the sensor at an undesirable mode of vibration of the scanning platform is reduced due to the sensor being disposed on the wider first flexure segment.

2. The scanning mirror assembly of claim 1 wherein the fixed platform comprises a silicon substrate.

3. The scanning mirror assembly of claim 2 wherein the component comprises metal.

4. The scanning mirror assembly of claim 2 wherein the component comprises plastic.

5. The scanning mirror assembly of claim 2 wherein the component comprises a magnetic material.

6. The scanning mirror assembly of claim 5 further comprising a plastic spacer between the fixed platform and the magnetic material.

7. The scanning mirror assembly of claim 1 wherein the first and second flexures each include the first and second segments, wherein the first segment is coupled to the scanning platform and the second segment is bisected perpendicularly by the first segment, and the second segment has ends that are coupled to the fixed platform.

8. The scanning mirror assembly of claim 7 further comprising bonding sites located beyond, and along an axis defined by, the first and second flexures, wherein the fixed platform is bonded to a component at the bonding sites, the component comprising a material dissimilar to that of the fixed platform.

9. A scanning mirror assembly comprising:
at least one magnet;
a moving-coil microelectromechanical system (MEMS) scanning mirror device mounted to the at least one magnet, the moving-coil MEMS scanning mirror device comprising a fixed platform bonded to the at least one magnet, a scanning platform, and first and second flexures coupling the scanning platform to the fixed platform, wherein the first flexure is coupled with the fixed platform via a first flexure segment, and the second flexure is coupled with the fixed platform via a second flexure segment, the first flexure segment being wider than the second flexure segment; and
a sensor disposed on the first flexure segment to produce an output in response to rotation of the scanning platform about a pivot axis;
wherein the output of the sensor at an undesirable mode of vibration of the scanning platform is reduced due to the sensor being disposed on the wider first flexure segment.

10. The scanning mirror assembly of claim 9 wherein the fixed platform comprises a silicon substrate.

11. The scanning mirror assembly of claim 9 further comprising a plastic spacer between the at least one magnet and at least a portion of the fixed platform.

12. The scanning mirror assembly of claim 9 wherein both the first and second flexures include first and second segments at right angles.

13. The scanning mirror assembly of claim 9 further comprising bonding sites located beyond, and along an axis defined by, the first and second flexures, wherein the fixed platform is bonded to the at least one magnet at the bonding sites.

14. The scanning mirror assembly of claim 9 wherein the first segment is coupled to the scanning platform and the second segment is bisected perpendicularly by the first segment, and the second segment has ends that are coupled to the fixed platform.

15. A mobile device comprising:
a light source to provide a light beam;
a scanning mirror assembly to reflect the light beam, the scanning mirror assembly including at least one magnet and a moving-coil microelectromechanical system (MEMS) scanning mirror device mounted to the at least one magnet, the moving-coil MEMS scanning mirror device comprising a fixed platform bonded to the at least one magnet, a scanning platform, and first and second flexures coupling the scanning platform to the fixed platform, wherein the first flexure is coupled with the fixed platform via a first flexure segment, and the second flexure is coupled with the fixed platform via a second flexure segment, the first flexure segment being wider than the second flexure segment; and
a sensor disposed on the first flexure segment to produce an output in response to rotation of the scanning platform about a pivot axis;
wherein the output of the sensor at an undesirable mode of vibration of the scanning platform is reduced due to the sensor being disposed on the wider first flexure segment.

16. The mobile device of claim 15 wherein the fixed platform comprises a silicon substrate.

17. The mobile device of claim 15 further comprising a plastic spacer between the at least one magnet and at least a portion of the fixed platform.

18. The mobile device of claim 15 wherein both the first and second flexures include first and second segments at right angles.

19. The mobile device of claim 15 further comprising bonding sites located beyond, and along an axis defined by, the first and second flexures, wherein the fixed platform is bonded to the at least one magnet at the bonding sites.

20. The mobile device of claim 15 wherein the first segment is coupled to the scanning platform and the second segment is bisected perpendicularly by the first segment, and the second segment has ends that are coupled to the fixed platform.

* * * * *